June 27, 1961  E. L. HOLBROOK ET AL  2,989,999
TIRE INFLATION CONTROL SYSTEM
Filed May 13, 1960  4 Sheets-Sheet 1

INVENTORS:
EDWARD L. HOLBROOK
ERNST W. SPANNHAKE
FRED S. WHALEY
BY John F. Schmidt INVENTORS:
EDWARD L. HOLBROOK
ERNST W. SPANNHAKE
FRED S. WHALEY
BY John F. Schmidt INVENTORS:
EDWARD L. HOLBROOK
ERNST W. SPANNHAKE
FRED S. WHALEY
BY John F. Schmidt June 27, 1961  E. L. HOLBROOK ET AL  2,989,999
TIRE INFLATION CONTROL SYSTEM Filed May 13, 1960  4 Sheets-Sheet 4

INVENTORS:
EDWARD L. HOLBROOK
ERNST W. SPANNHAKE
FRED S. WHALEY
BY *John F. Schmidt*

United States Patent Office 2,989,999
Patented June 27, 1961

2,989,999
TIRE INFLATION CONTROL SYSTEM
Edward L. Holbrook, Bay Village, Ohio, Ernst W. Spannhake, Butler, N.J., and Fred S. Whaley, Northbrook, Ill.; said Spannhake, assignor to LeTourneau-Westinghouse Company, Peoria, Ill., a corporation of Illinois, and said Holbrook and said Whaley, assignors to Westinghouse Air Brake Company, Wilmerding, Pa., a corporation of Pennsylvania
Filed May 13, 1960, Ser. No. 29,009
14 Claims. (Cl. 152—416)

This invention relates to pneumatic control systems for remotely controlling the pressures of fluid in a plurality of inflatable members, and more particularly relates to an inflation control system for selectively or concurrently controlling from the cab or other station on a vehicle the pressures of fluid in a plurality of tires on such vehicle.

There are numerous applications, of off-highway vehicle types which present a wide variety of terrain conditions. A cross-country vehicle, for example, may be required to negotiate sand, mud, swamps, and hard, well-packed ground—all within a matter of a few miles and a relatively short span of time. The traction problems vary as the surface of the terrain varies, and it is desirable to provide the vehicle operator with means to control the characteristics of his vehicle in accordance with variations in the traction requirements. To obtain the traction required for a soft, yielding surface, the vehicle tires should be inflated to a relatively low pressure, while movement on a hard and smooth surface calls for a high tire pressure to minimize rolling resistance and permit operation at comparatively high speeds.

It is therefore an object of this invention to provide an improved pneumatic remote control system of the above type wherein the operator, by varying the selectable pressure of fluid provided in a single control pipe, can cause fluid under pressure to be bottled up in a plurality of inflatable members, such as vehicle tires, or effect a slow charging or release of pressure in said members to a desired value within a predetermined normal operating range of member pressures and corresponding to the pressure of fluid provided in the control pipe, or effect a rapid deflation of the members to a chosen minimum pressure greater than atmospheric pressure.

Another object is to provide a control system of the above type especially suitable for remotely changing tire pressures on heavy construction vehicles or military vehicles so as, with a minimum of delay, to increase tire pressure to reduce tire wear or decrease tire pressure to improve traction as such vehicles are required to travel over different types of terrain, such as hard-surfaced highways of marsh land.

Another object is to provide an improved tire inflation control system wherein fluid under pressure is conveyed to the tire by way of a communication through a wheel-carrying axle, which communication may be maintained vented except when a change in tire pressure is to be effected, so that no leakage of fluid under pressure from the system can occur by way of said communication except during the relatively short period of time such change in tire pressure is being effected.

According to these objects, the improved pneumatic control system comprises at least one inflation control valve device which responds to venting of a conduit to bottle up fluid under pressure in an inflatable member, responds to charging of said conduit to a pressure within a predetermined range of operating pressures between a predetermined low value and a predetermined high value to permit pressure fluid to be supplied to or released from said inflatable member via said conduit and preferably at a restricted rate controlled by a restriction interposed in said conduit, and responds to charging of said conduit to a higher pressure above said predetermined high value to connect the inflatable member to an exhaust, in by-pass of the restriction if used, so as to rapidly deflate the member. The system also preferably includes a retaining valve in the exhaust so that pressure in the inflatable member will not be reduced below a chosen minimum value when said member is connected to the exhaust. The system also may optionally comprise a selector valve device for connecting the conduits leading to respective inflation control valve devices concurrently or selectively to a single control pipe in which pressure fluid is varied under control of the operator from zero to any desired value within said range or to said higher pressure, so that pressures in the inflatable members may be controlled selectively or concurrently upon variations in pressure in the control pipe.

When the system is employed to control inflation of a plurality of tires on the vehicle, one inflation control valve device and its associated conduit are preferably carried on each wheel so that when these conduits are vented, as will normally be the case except when tire pressure is to be changed, no leakage of fluid under pressure can occur from the tire via the wheel-carrying axle and the axle housing through which pressure fluid must be conveyed to the tire.

Other objects and advantages will become apparent from the following more detailed description of the invention and from the accompanying drawings, wherein.

Description

Figure 1:
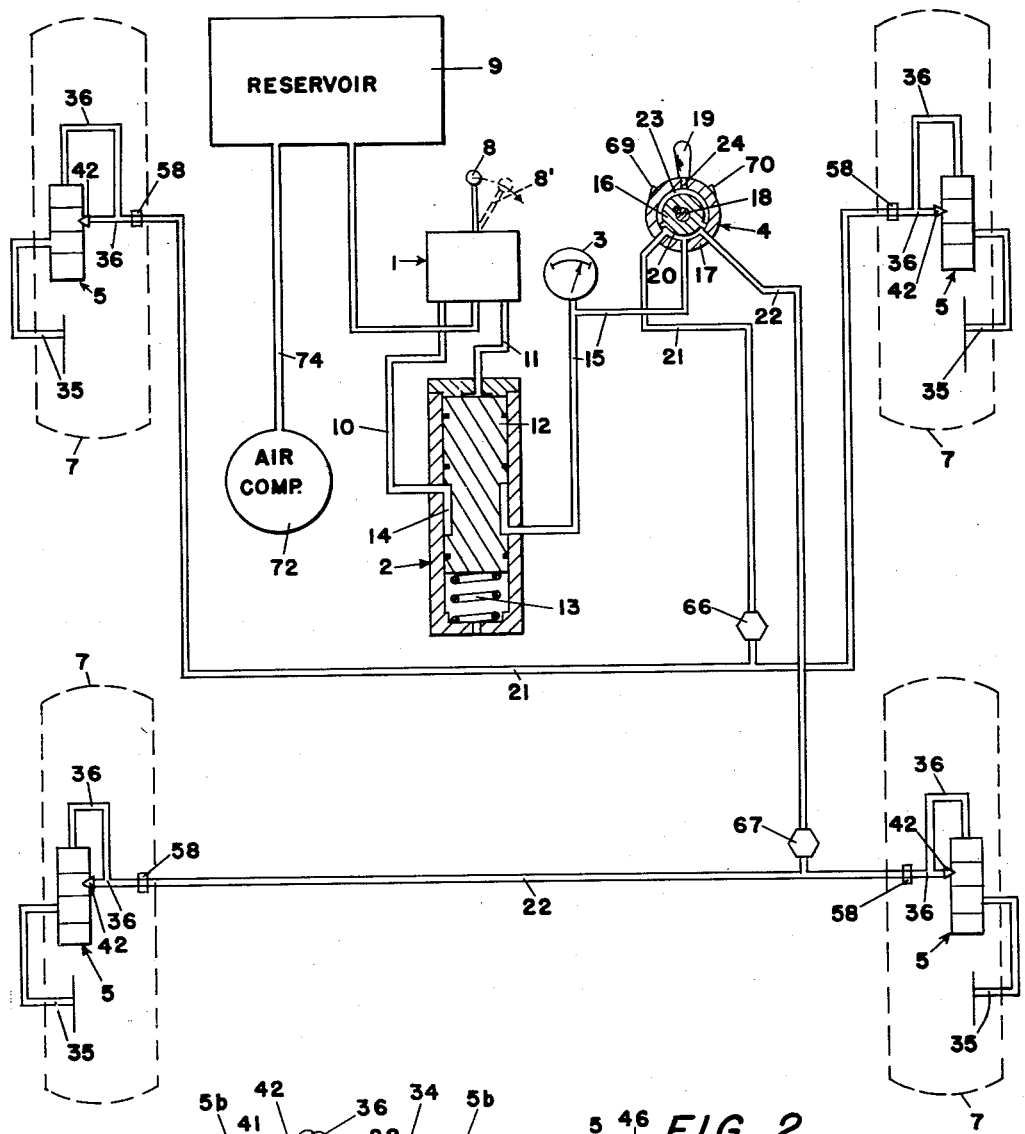
FIG. 1 is a diagrammatic view of an inflation control system, constructed according to the preferred embodiment of the invention, for controlling pressures of fluid in tires on a vehicle.

The tire inflation control system constructed according to this embodiment of the invention comprises an operator's control valve device 1, a cut-off valve device 2, a pressure gage 3, and a selection valve device 4, each located in the cab of a vehicle, and a plurality of tire inflation control valve devices 5 each mounted on a respective wheel 6 (FIG. 5) of the vehicle for controlling the pressure of fluid in a corresponding inflatable tire 7 mounted on such wheel.

Figure 2:
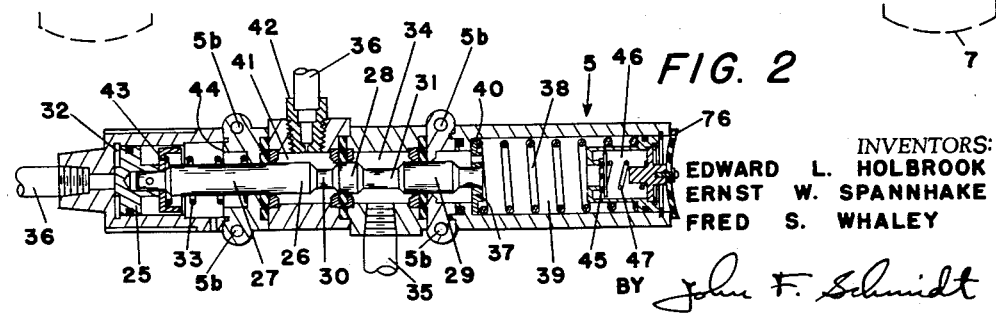
FIG. 2 is a view in section of one of the tire valves of FIG. 1 but on a much larger scale than FIG. 1.

The operator's control valve device 1 may be of any well-known type, such as disclosed in FIG. 2 of U.S. Patent No. 2,173,940 granted on September 26, 1939, to E. E. Hewitt. This valve device 1 comprises, briefly, self-lapping valve means (not shown) responsive to arcuate movement in the plane of the paper, FIG. 1, of a handle 8 from the position shown in solid lines, clockwise into an application zone as shown at 8', to supply fluid under pressure from a reservoir 9 to a control pipe 10 (corresponding to pipe 302 of said patent) for providing in said control pipe fluid at a selectable pressure corresponding to the setting of the handle in the zone; and responsive to movement of the handle counterclockwise toward the position shown in solid lines to provide fluid at a corresponding reduced pressure in the control pipe. This valve device 1 also comprises other valve means (not shown) responsive to depression (movement in a plane perpendicular to the plane of the paper) of the handle 8, while in the application zone, to supply fluid at the pressure of fluid in the reservoir 9 to an actuating pipe 11 (corresponding to pipe 94 of said patent); the handle is normally biased to an elevated position—i.e., into the plane of the paper—for causing said other valve means to vent pipe 11.

The cut-off valve device 2 may comprise a spool 12 sealingly reciprocable in a bore in a sectionalized casing and subject opposingly to pressure of fluid in pipe 11 and to pressure of a helical bias spring 13 in an atmospheric chamber. When pipe 11 is vented, spring 13 biases spool 12 to a normal position, in which it is shown, and in which an elongated annular groove 14 in the valve connects control pipe 10 to a pipe 15 having branches leading to the gage 3 and to device 4.

The selector valve device 4 may, for sake of illustration, be of the cock type comprising a plug 16 rotatably disposed in a casing 17 and operably connected to a shaft 18 secured to a handle 19. When the handle 19 is in the upright or intermediate position, in which it is shown, a groove 20 in the plug will be so disposed as to concurrently connect pipe 15 with two pipes 21, 22; and all of said pipes will be sealed off from another groove 23 that is constantly open to a vent port 24 through the casing.

Each tire inflation control valve device 5 (FIG. 2) may comprise a piston 25 reciprocable in a bore in a sectionalized casing and coaxially connected to a spool 26. Spool 26 has three axially spaced lands 27, 28, 29 adapted to sealingly slide within and relative to annular resilient seals carried by the casing; and the spool has two elongated annular grooves 30, 31 disposed adjacent opposite ends of the intermediate land 28.

When the pressure of fluid in a pressure chamber 32 at the face of piston 25 remote from spool 26 is less than a predetermined low value, such as about 10 p.s.i., the piston and hence the spool will be biased to a lap position, in which they are shown, by a light helical spring 33 in an atmospheric chamber. With spool 26 in this position, each of the lands 27, 28, 29 sealingly engages its corresponding resilient seal for bottling up fluid under pressure in a delivery chamber 34 and thereby in the corresponding tire 7, which is constantly connected to said delivery chamber by way of a delivery conduit 35, connected to rim fitting 35a. The tires may be charged with air independently of this invention through conventional fittings, one of which is shown at 6a in FIG. 3.

When chamber 32 is charged by way of a supply conduit 36 with fluid at any pressure within a predetermined operating range defined between said predetermined low value and a predetermined high value, such as about 85 p.s.i., then piston 25 and spool 26 will shift against resistance of spring 33 to a slow charge and release position, in which the land 29 abuts a spring retaining washer 37 but does not effect compression of a relatively heavy helical spring 38. Spring 38 is disposed in an exhaust chamber 39 and bears at one end against the end wall of the casing and at its other end biases washer 37 into contact with a shoulder 40 in the casing so as normally to cage said heavy spring. With spool 26 in this position, land 29 continues to engage its resilient seal, and groove 30 connects the delivery chamber 34 with a supply chamber 41 preferably connected via a restriction 42 to a branch of conduit 36.

When the fluid pressure supplied via conduit 36 to chamber 32 exceeds said predetermined high value, piston 25 and hence spool 26 will be shifted against the combined resistance of springs 33, 38 to a quick-release position, which may be defined by contact of a piston follower 43 with a shoulder 44 in the casing. With spool 26 in quick-release position, land 27 engages the resilient seal between chambers 41, 34, and groove 31 connects delivery chamber 34 to exhaust chamber 39. A retaining valve 45 of the check-valve type preferably is disposed in an atmospheric chamber 46 in the casing of device 5 and biased to a seated position by a helical spring 47 in said chamber so as normally to cut off the exhaust chamber 39 from the atmosphere; said retaining valve, by virtue of the bias effect of spring 47, serves to prevent the pressure in the corresponding tire 7 from being reduced below a chosen minimum value when the valve 26 is shifted to quick-release position. This chosen minimum value corresponds to a predetermined minimum tire pressure which will enable the tires to have adequate traction for negotiating swampy terrain.

Figure 3:
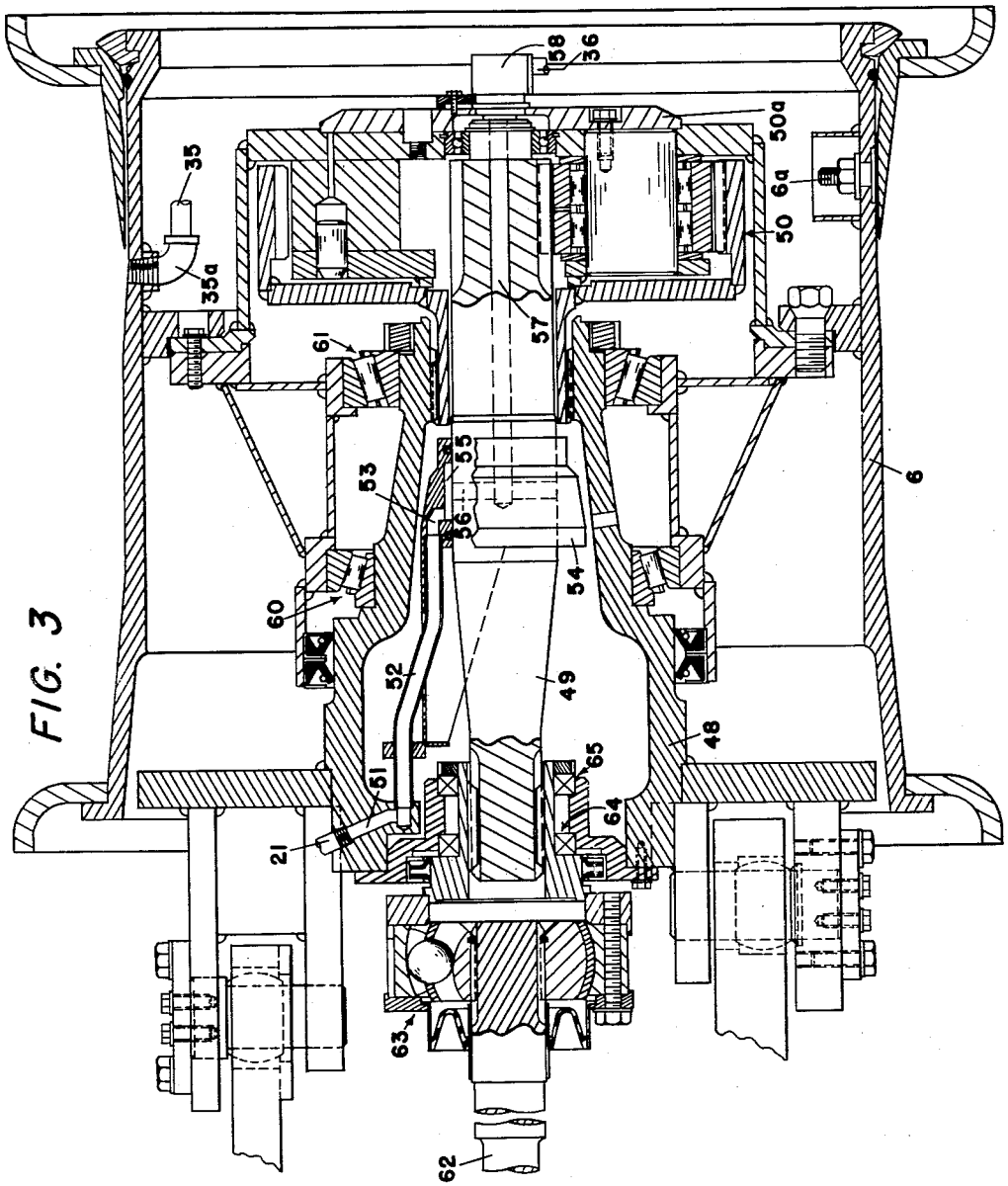
FIG. 3 is a fragmentary section view of an axle, axle housing and wheel of the vehicle showing the manner in which pressure fluid may be supplied to a tire inflation control valve device shown in detail in FIGS. 1 and 2 (the valve device of FIG. 2 is not shown in this view)
Figure 4:
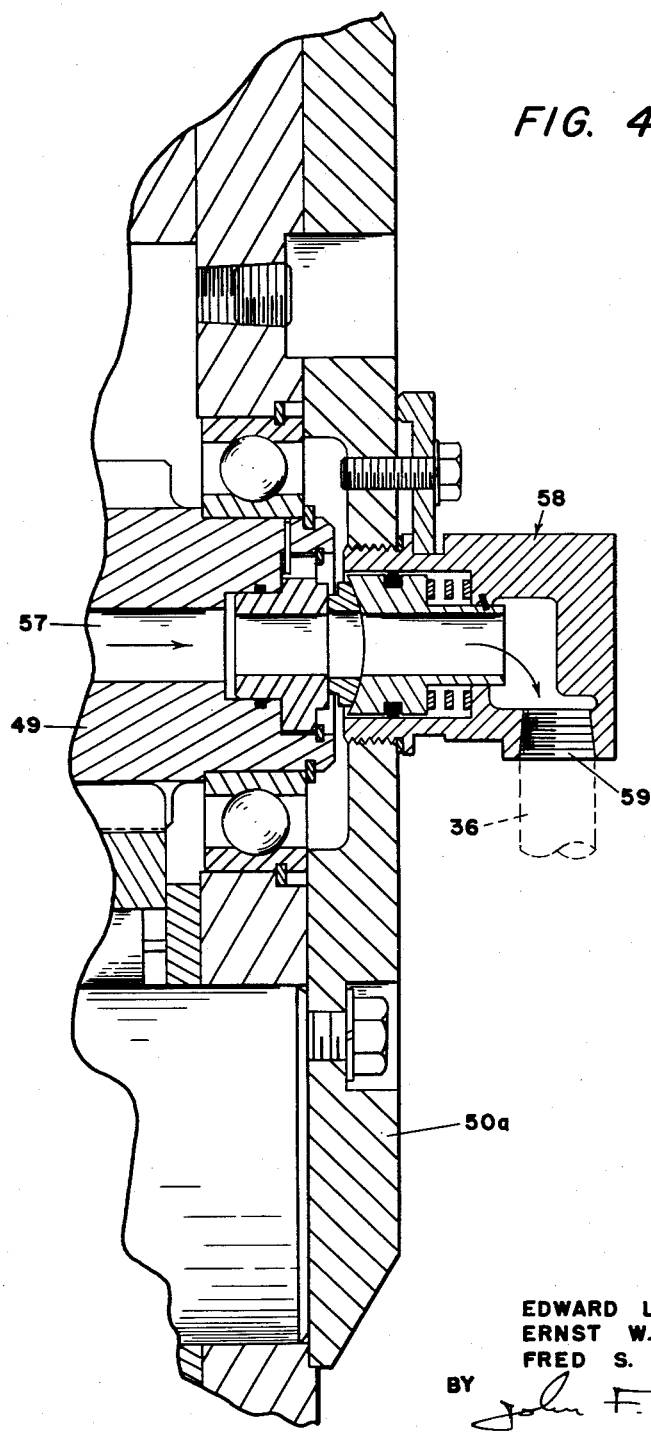
FIG. 4 is a view in section of a portion of FIG. 3 but on a much larger scale, showing details which cannot readily be shown in FIG. 3.

The pressures of fluid provided in the respective conduits 36 for controlling operation of the devices 5 associated with the respective wheels 6 are controlled from the pipes 21, 22. For sake of illustration, pipe 21 is shown in FIG. 3 leading to an axle housing 48 in which is rotatably disposed a driving axle shaft 49 by which one of the wheels 6 is driven through a speed reducing power train 50. Pipe 21 is constantly connected to the conduits 36 on these two wheels by way of suitable radial ports and other passages through the axle housing and the axle shaft. Thus, a passage 51 in the axle housing 48 communicates pipe 21 with a passage 52. Passage 52 is here shown as a piece of tubing fixed in housing 48, connecting passage 51 with a passage or port 53 in a collar 54. Axle shaft 49 rotates inside collar 54 which is internally grooved as at 55 to connect with passages 56 and 57 in axle shaft 49. As is best seen in FIG. 4, the rotating axle shaft 49 and its passage 57 connect with a rotary joint 58 having an outlet connection 59. Conduit 36 communicates directly with connection 59.

Although axle shaft 49 and rotary joint 58 both rotate, they do so at different speeds because of the power train 50.

It will be understood by those skilled in the art that the tire pressure control means here disclosed is independent of such factors as axle details, whether the vehicle is of the two-wheel or four-wheel drive type, etc. In an embodiment of the invention which was actually constructed, the vehicle was of the four-wheel drive type, in which one axle housing was mounted rigid relative to the frame, whereas the other axle housing was mounted to permit limited oscillation about a horizontal axis. Except for such structural differences as are incidental to these functional differences, the two axles were largely the same. No effort is made here to illustrate these differences and it will be assumed that the axle carrying the other two wheels, served by pipe 22, may be of any type suited to vehicle operation, and no further description thereof will be provided.

Returning to FIG. 3, it can be seen that wheel 6 is rotatably mounted on axle housing 48 by means of anti-friction bearings 60 and 61. Power is supplied to shaft 49 by a drive shaft 62 through a suitable universal joint 63. Anti-friction bearings 64 and 65 are provided to support the splined left end of shaft 49. Suitable lubricant, dust, and dirt seals, welds, threaded fasteners, and numerous other details are conventional and need not be set forth here as they will readily be understood by those skilled in the art.

Figure 5:
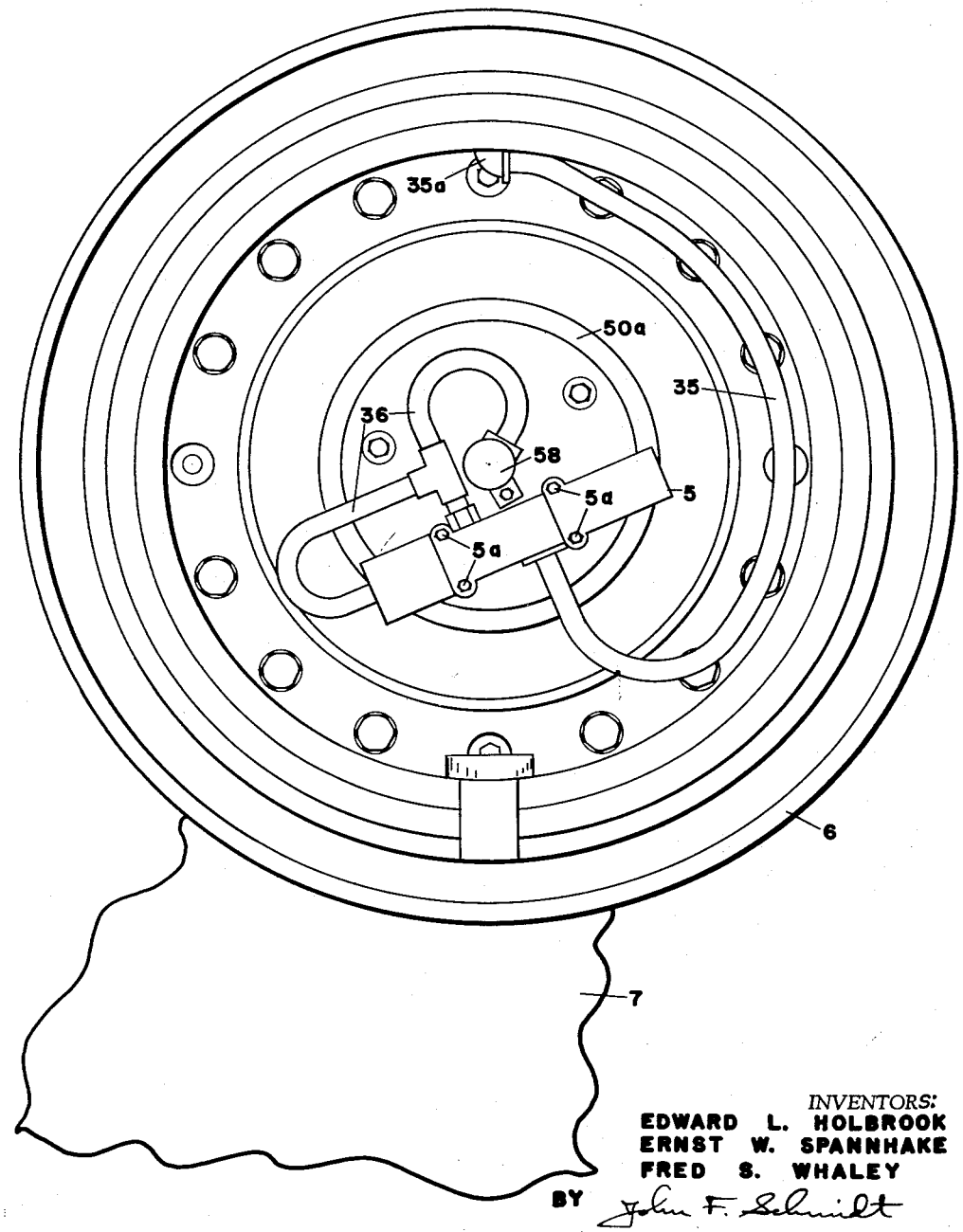
FIG. 5 is a view as seen from the right end of FIG. 3, and on substantially the same scale. The valve device of FIG. 2 is shown in this figure.

Referring again to FIG. 1, quick-release valves 66 and 67 may be provided in the pipes 21 and 22 respectively for a purpose that will be detailed hereinafter. Valves 5 are mounted on cover 50a by means of threaded members 5a passing through holes 5b in the valve body, as is best seen in FIG. 5.

*Operation*

Assume initially that handle 8 of operator's control valve device 1 is in its normal position and is not being depressed; and that handle 19 of selector valve device 4 is in its intermediate or upright position. Under this condition, all components will be in the respective positions in which they are shown in this figure of the drawing, and fluid under pressure will be bottled up in all of the tires 7.

To increase or decrease the pressure of fluid in these tires to a selected value within the predetermined operating range (illustratively assumed as 10 to 85 p.s.i.), the handle 8 is moved arcuately to provide fluid at said selected value of pressure in the control pipe 10. Assuming that the pressure provided in the control pipe 10 exceeds that then existing in the tires 7, fluid under pressure will flow from pipe 10 via cut-off valve groove 14 to pipe 15 and thence via selecter valve groove 20 to pipes 21, 22, whence it will flow via previously-described communication to the conduits 36 on the respective wheels. Pressure fluid thus applied to each conduit 36 will shift the piston 25 (FIG. 2) and spool 26 of the corresponding tire inflation control valve device 5 to their previously defined slow charge and release position for permitting fluid under pressure to flow via conduit 36, restriction 42, supply chamber 41, groove 30, delivery chamber 34, and conduit 35 to the corresponding tire 7 for charging the latter to equality with the selected value of control pipe pressure. If, however, the pressure provided in the control pipe 10 should be less than that then existing in the tires 7, it will be apparent that tire pressure will be reduced to the selected value of control pipe pressure by reverse flow through the communication just described and at the rate controlled by restriction 42.

The selector valve handle 19 may be moved counterclockwise into contact with a casing lug 69 for so rotating plug 16 as to cause its exhaust groove 23 to connect pipe 21 to vent port 24 while maintaining pipes 15, 22 connected via valve groove 20; and said handle may be moved clockwise into contact with a casing lug 70 for so rotating plug 16 as to cause exhaust groove 23 to connect pipe 22 to vent port 24 while maintaining pipes 15, 21 connected via valve groove 20. Hence, if it is desired to vary the pressure in the tires 7 of the two wheels served by pipe 22 but not vary the tire pressure of the wheels served by the pipe 21, the handle 19 should be rocked into contact with lug 69 before control valve handle 8 is moved clockwise from its normal position; and in similar fashion, by initially rocking handle 19 into contact with lug 70, the tire pressure of only the wheels served by pipe 21 will be varied upon subsequent arcuate clockwise movement of the handle 8. The selector valve device 4 is therefore provided in those cases, where both concurrent and selective control of pressures in the tires is desired; and said device may be eliminated if it is desired to control pressure in all tires concurrently.

In either event, while the handle 8 is in the application zone, it may be depressed for charging pipe 11 and thereby shifting cut-off spool 12 against the resistance of spring 13 to a cut-off position, in which pipes 10 and 15 are disconnected, for permitting gage 3 to accurately record the tire pressure existing in all or certain of the tires 7 (according to where selector valve handle 19 is then positioned), unaffected by the pressure head in the control pipe 10. The cut-off valve device 2 is especially desirable when the tire inflation control system is to be employed on heavy-duty construction equipment or military vehicles having many tires of high volume, for this will permit periodic checks on tire pressure during the relatively long period of time required to inflate these tires to the high pressure used when traveling on hard-surface highways. It should be noted that the restrictions 42 are preferably provided to permit the use of a relatively small engine-driven compressor 72 for charging the reservoir 9 via a pipe 74. The respective flow capacities of these restrictions 42 are preferably equal; and the aggregate of such flow capacities preferably is substantially equal to the charging rate of the compressor to permit the tires 7 to be charged as rapidly as possible, yet prevent pressure in the reservoir 9 from being reduced when all of the tires are being inflated simultaneously, so that reservoir pressure will be maintained substantially constant and thus assure that sufficient pressure will always be available in the reservoir to enable actuation of the inflation control spools 26 to their quick release position, in the manner now to be described.

Assume now that the vehicle is leaving a hard-surface highway and entering onto swampy terrain. To quickly deflate all or certain of the tires 7 (according to the preselected position of the selector valve handle 19), and thereby improve tire traction, the handle 8 is moved arcuately to an extreme position in the application zone so as to provide in control pipe 10 fluid at a very high pressure, such as the pressure of fluid in the reservoir 9, which exceeds the aforementioned predetermined operating range of tire pressures. During this arcuate movement of handle 8, it should not be depressed, so that pipe 11 will be maintained vented and thereby permit fluid at this very high pressure to flow via cut-off valve groove 14 and pipe 15 to those conduits 36 which are then connected to pipe 15 by way of the selector valve 4; whereupon the piston 25 and spool 26 associated with each such charged conduit 36 will be promptly shifted to the previously-defined quick release position against the combined resistance of springs 33, 38 for permitting fluid under pressure to flow from its respective tire 7 by way of valve groove 31 to exhaust chamber 39 and thence to atmosphere past the retaining valve 45 and a deflectable rubber dirt guard 76 which prevents entry of dirt and moisture into the device 5. Tire pressure will thus be reduced rapidly, in bypass of restriction 42, to the chosen mainmum value of pressure desired to be retained in the tire, as determined by the chosen bias effect of spring 47.

It is to be noted that a separate valve device 5 and conduit 36 is preferably provided on each wheel so that when the respective conduits 36 are vented and the spools 26 move to lap position for bottling up pressure fluid in the corresponding tires 7, the passages 51—59 in the structure shown in FIGS. 3 and 4 will be vented; and hence there will be no possibility of leakage of pressure fluid from the tires by way of said passages.

Accordingly, after the handle 8 has been moved into the application zone for shifting all or some of the spools 26 to slow charge and release position, said handle should be returned to normal position for venting control pipe 10 and thereby causing the spools 26 to be shifted to lap position, as soon as possible after the operator has verified (by actuation of the cut-off valve device 2 to obtain an accurate reading on gage 3 as above described) that the particular tires 7 have been inflated or deflated to the desired pressure.

The foregoing description of the operation is based on a system having no quick-release valves 66, 67 and in which the pipes 10, 15, 21, 22 and 36 are large enough to permit rapid venting thereof with handle 8 in the neutral position as shown at 8 (solid lines), FIG. 1, so that pistons 25 and spools 26 of devices 5 will assume the lap position. If the pipes referred to are very long and relatively small, it may be found that they will not vent quickly enough to cause the devices 5 to bottle up air in the tires; instead, the devices 5 may continue to deflate the tires through restriction 42 as they do when the operator actuates handle 8 to admit fluid to pipes 21 and 22 under a pressure that is lower than the pressure already in the tires.

To avoid this difficulty, quick-release valves 66 and 67 may be provided, preferably as close as may be practicable to the tires. These valves are available as standard commercial items, and may be of the type shown at FIG. 2 of Patent 2,040,580, issued May 12, 1936, to Stephen Vorech.

When quick-release valves 66, 67 are used, the best actual practice is to inflate the tires at maximum range pressure (85 p.s.i.), and deflate at full line pressure (the pressure in reservoir 9). Furthermore, to get a tire pressure reading on gage 3, handle 8 should first be moved arcuately in the plane of the paper to a position that is known to provide an application zone pressure higher than that of the tires. Handle 8 is then depressed to move spool 12 to the cut-off position. Pressure will then bleed into the tires, become static, and gage 3 will show what the pressure is.

While there is in this application specifically described one form which the invention may assume in practice, it will be understood that this form of the same is shown for purposes of illustration and that the invention may be modified and embodied in various other forms without departing from its spirit or the scope of the appended claims.

We claim:

1. A pneumatic control system for remotely controlling the pressures of fluid in a plurality of inflatable members, said system comprising, in combination, a control pipe, operator-controlled valve means connected to the control pipe and operable to vent said control pipe or to provide therein fluid at a selectable pressure within a predetermined range of inflation pressures for the members or at a higher pressure beyond said range, a plurality of inflation control valve devices each having fluid pressure connection with the control pipe and with corresponding different ones of the members, each of said inflation control valve devices being controlled by pressure of fluid in the control pipe and operative according to whether fluid pressure in the pipe is within or exceeds said range to connect each such corresponding member to the pipe or to an exhaust communication, respectively, and each of said inflation control valve devices being responsive to venting of the pipe to bottle up fluid under pressure in each such corresponding member in which it controls the pressure of fluid.

2. A system as in claim 1, and quick-release means between the operator-controlled valve means and the inflation control valve devices and responsive to venting of the control pipe by said valve means to open the control pipe to atmosphere at the quick-release means.

3. A pneumatic control system for remotely controlling the pressures of fluid in a plurality of inflatable members, said system comprising, in combination, a control pipe, operator-controlled valve means connected to the control pipe and operable to provide in said control pipe fluid at a selectable pressure within a predetermined range of inflation pressures for the members or at a higher pressure beyond said range, a plurality of inflation control valve devices each connected to and controlling pressures of fluid in associated different ones of the members, a plurality of conduits each conveying pressure fluid to and from a corresponding one of the devices, each of said devices being operative according to whether fluid pressure in its respective conduit is within or exceeds said range to connect each such associated member with such respective conduit via a restriction or to an exhaust communication in bypass of said restriction, respectively, and selector valve means operable to different positions to establish fluid pressure connection of said conduits concurrently or selectively with said control pipe so as to enable concurrent or selective inflation and deflation of the different members.

4. A system as in claim 3, and quick-release means in the conduits between the operator-controlled valve means and the inflation control valve devices and responsive to venting of the conduits by said valve means to open the conduits to atmosphere at the quick-release means.

5. A control system according to claim 3, including cut-off valve means interposed in the control pipe and in one position permitting flow through the control pipe between the operator-controlled valve means and the selector valve means and operable to another position to prevent such flow, and a pressure gage connected to that part of the control pipe leading from the cut-off valve means to the selector valve means, whereby with the cut-off valve means in its said other position accurate readings of the pressures in all or certain of the inflatable members can be obtained according to the positioning of the selector valve means and unaffected by any pressure head then existing in the part of the control pipe leading to the operator-controlled valve means.

6. A pneumatic control system for remotely controlling the respective pressures of fluid in inflatable tires mounted on wheels carried by different axles on a vehicle, said system comprising, in combination, a control pipe selectively ventable to atmosphere or chargeable by an operator with fluid at a selectable pressure within a predetermined range of operating tire pressures or at a higher pressure beyond said range, a plurality of inflation control valve devices each controlling the pressures of fluid in at least one of the tires associated with each axle, a plurality of conduits each conveying pressure fluid to and from a corresponding one of said control valve devices, selector valve means, variously positionable to connect said control pipe concurrently or selectively to said conduits and vent each conduit not so connected, each of said control valve devices being responsive to venting of its respective conduit to bottle up fluid under pressure in each associated tire in which it controls the pressure, and responsive to a pressure in its respective conduit within said range to connect such respective conduit to each such associated tire for inflating the latter to a pressure corresponding to that then provided in the control pipe, and responsive to said higher pressure in its respective conduit to cut off such respective conduit from each such associated tire and connect the latter to a corresponding exhaust communication for deflating each such associated tire.

7. A control system according to claim 6, including a retaining valve interposed in each exhaust communication and limiting the degree to which each such associated tire will be deflated when it is connected to its corresponding exhaust communication.

8. A control system according to claim 6, wherein each conduit has one branch leading substantially without restriction from the selector valve means to a pressure chamber provided in the associated control valve device and in which chamber the pressure of fluid is varied to control positioning of said control valve device, and each conduit has another branch leading from said selector valve means to such associated control valve device and containing a restriction which restricts the rate of change of pressure in each such associated tire when the corresponding control valve device is positioned to connect the respective conduit thereto, such that when the respective conduit is charged to said higher pressure each such associated tire will be deflated rapidly by release flow of fluid under pressure from such tire to the exhaust communication in bypass of such restriction.

9. A pneumatic control system for remotely controlling the pressures of fluid in inflatable tires mounted on a plurality of wheels operatively carried by at least one axle housing of a vehicle, the housing having at least one axle rotatably mounted therein, said system comprising, in combination, a control pipe selectively ventable to atmosphere or chargeable by an operator with fluid at a selectable pressure within a predetermined range of operating tire pressure or at a higher pressure beyond said range, a plurality of inflation control valve devices one carried by each wheel and controlling the pressure of fluid in the corresponding tire mounted on such wheel, a plurality of fluid conveying means each including ports and passages through the respective axle housing and axle and via which pressure fluid is conveyed between the control pipe and a corresponding inflation control valve device, each of the inflation control valve devices being responsive to venting of its corresponding conveying means via the control pipe to bottle up fluid under pressure in the corresponding tire, and responsive to charging of said control pipe and thereby of said corresponding conveying means with fluid at a selected pressure within said range to connect said corresponding conveying means to said corresponding tire to supply and release fluid under pressure from the latter as necessary to provide in such tire fluid at said selected pressure, and responsive to charging of said control pipe and thereby said corresponding conveying means with fluid at said higher pressure to connect the corresponding tire to a corresponding exhaust communication in bypass of said corresponding conveying means to effect deflation of such tire, whereby leakage of pressure fluid from each tire by way of said ports and passages of the corresponding conveying means will be positively prevented except during the relatively short period of time that the control pipe and corresponding conveying means need be charged to effect a change in tire pressure because the corresponding conveying means can be maintained vented except during such period.

10. A control system according to claim 9, including selector valve means variously positionable to connect the control pipe concurrently to all or selectively to certain ones of the conveying means, whereby pressures in the respective tires can be varied concurrently or selectively according to the preselected position of said selector valve means and the fluid pressure provided in said control pipe.

11. A control system according to claim 9, wherein each conveying means comprises two branches each located on a corresponding wheel and each connected to the corresponding inflation control valve device, one of said branches including a restriction and being connectable by such corresponding valve device to the corresponding tire, and the other branch of which has no flow restricting means and controls operation of such corresponding valve device, whereby fluid under pressure will be supplied to or released from the corresponding tire at the restricted rate controlled by said restriction when control pipe pressure is within said range and will be rapidly released from such tire in bypass of said restriction and via the exhaust communication when the control pipe is charged to said higher pressure.

12. A control system according to claim 11, including a retaining valve in each exhaust communication preventing tire pressure from reducing below a chosen minimum value when the corresponding tire is connected to such exhaust communication.

13. A pneumatic control system for remotely controlling the pressures of fluid in a plurality of pneumatically chargeable members, said system comprising, in combination, a control pipe, operator-controlled valve means connected to the control pipe and operative to vent said control pipe or provide fluid at a selectable pressure therein, a plurality of communications, selector valve means connected to said control pipe and to said communications and variously positionable to concurrently or selectively connect said communications to said control pipe, a plurality of control valve devices each connected to a respective one of the communications and to different ones of the members, each control valve device being subject opposingly to pressure of fluid in such respective communication and to a resilient bias pressure and responsive to charging of such communication to a pressure within a predetermined range of superatmospheric pressures to connect such communication to each particular member to which such control valve device is connected, and responsive to charging of such communication to a pressure beyond said range to connect each such particular member to a vent in bypass of such communication, and responsive to venting of such communication to cut off each such particular member from the vent and from such communication to lap the pressure in each such particular member, whereby upon charging of the control pipe the pressures of fluid will be varied in only those members whose associated control valve devices have their respective communications then connected to the control pipe by said selector valve means.

14. A system as in claim 13, and a quick-release means in each of the communications and responsive to venting of its associated communication by the operator-controlled valve means to open the thus-vented communication to atmosphere at the quick-release means.

No references cited.